Feb. 25, 1964   H. O. HOLZ   3,122,217
TRACTOR BRAKE HAVING READILY RENEWABLE LININGS
Filed Nov. 25, 1960                                        2 Sheets-Sheet 1

INVENTOR.
HAROLD O. HOLZ
BY
ATTORNEYS.

Feb. 25, 1964  H. O. HOLZ  3,122,217
TRACTOR BRAKE HAVING READILY RENEWABLE LININGS
Filed Nov. 25, 1960  2 Sheets-Sheet 2

INVENTOR.
HAROLD O. HOLZ,
BY
ATTORNEYS.

United States Patent Office 3,122,217
Patented Feb. 25, 1964

3,122,217
TRACTOR BRAKE HAVING READILY
RENEWABLE LININGS
Harold O. Holz, Linden, Mich., assignor to Massey-Ferguson Inc., Detroit, Mich., a corporation of Maryland
Filed Nov. 25, 1960, Ser. No. 71,763
6 Claims. (Cl. 188—18)

The present invention relates to vehicle brakes and more particularly to a brake for an agricultural tractor or the like.

It is common practice in agricultural tractors to employ compact disc brakes of high torque capacity fully enclosed within the trumpet of the tractor rear axle housing. The problem is that brakes thus enclosed require a large amount of labor in replacing the brake linings. Even casual inspection in order to determine the condition of the brake linings requires removal of the heavy wheel and hub which is specially onerous on the larger sizes of tractors.

It is the primary object of the present invention to provide an improved tractor brake of the disc type which is fully enclosed within the trumpet of the tractor axle housing but which nevertheless may be quickly and easily serviced. It is another object of the invention to provide a tractor disc brake in which the brake linings may be removed and new brake linings substituted in only a few minutes time and without necessity for removing the wheel of the tractor. It is a further object of the present invention to provide an enclosed disc brake for a tractor having a plurality of brake lining elements which are secured together as a unitary insert for withdrawal and replacement simultaneously. In this connection it is an object to provide a tractor brake of the disc type in which the entire lining assembly can be withdrawn laterally from the tractor rear axle, with the assembly being held in place by a few bolts which may be readily unscrewed for periodic inspection of the condition of the brake linings.

It is another object of the invention to provide an enclosed disc type tractor brake in which the brake linings may be removed and replaced without exercise in care or attention and in which the brake linings are automatically centered with respect to the surfaces which they engage without adjustment and simply by seating the assembly on reference surfaces provided on the tractor rear axle housing.

It is a further object of the present invention to provide a tractor disc brake which has removable lining elements and which are readily replaceable yet anchored in a novel fashion in order to resist extremely high torques which may be achieved under emergency braking conditions. It is an object related to the foregoing to provide a disc type brake for a tractor having brake lining elements which are capable of resisting large torsional forces but which nevertheless are free floating and thus free to move axially as the brake is applied and released.

It is still another object of the invention to provide a tractor brake construction which is highly economical and in which the farmer may readily inspect or replace the brake linings on even the largest sizes of tractors quickly and easily and without having to incur the expense of a mechanic and without requiring the tractor to be taken out of service during the busy season.

Other objects and advantages of the invention will become apparent upon reading the attached detailed description and upon reference to the drawings in which.

While the invention has been described in connection with a preferred embodiment, it will be understood by one skilled in the art that the invention is not limited to the embodiment shown but contemplates alternative and equivalent constructions falling within the spirit and scope of the appended claims.

Figure 1:
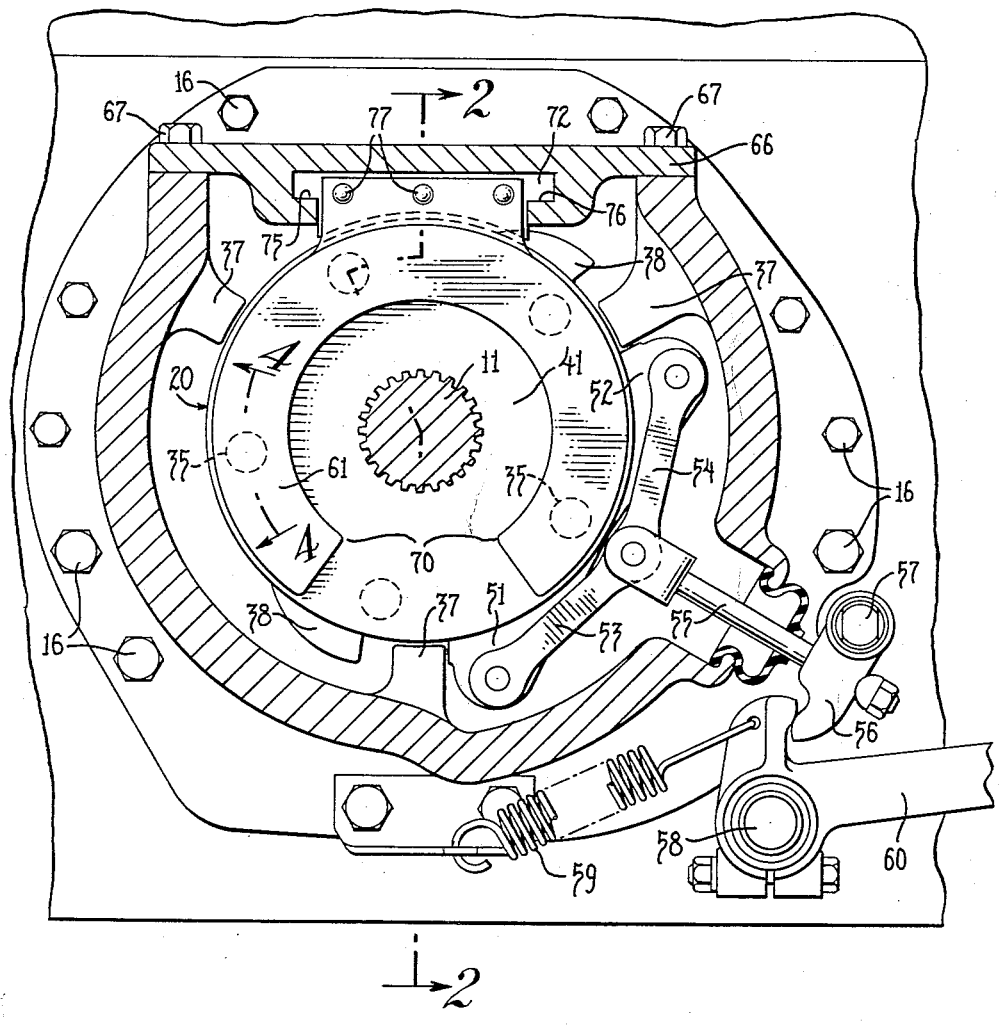
FIGURE 1 is a transverse section of a brake constructed in accordance with the present invention and taken along the line 1—1 in FIG. 2.
Figure 4:
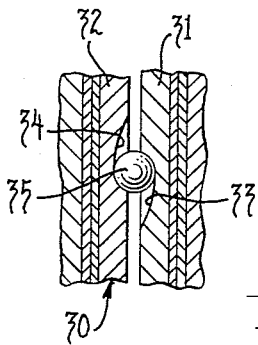
FIG. 4 is a fragmentary section taken along the line 4—4 in FIG. 1.
Figure 2:
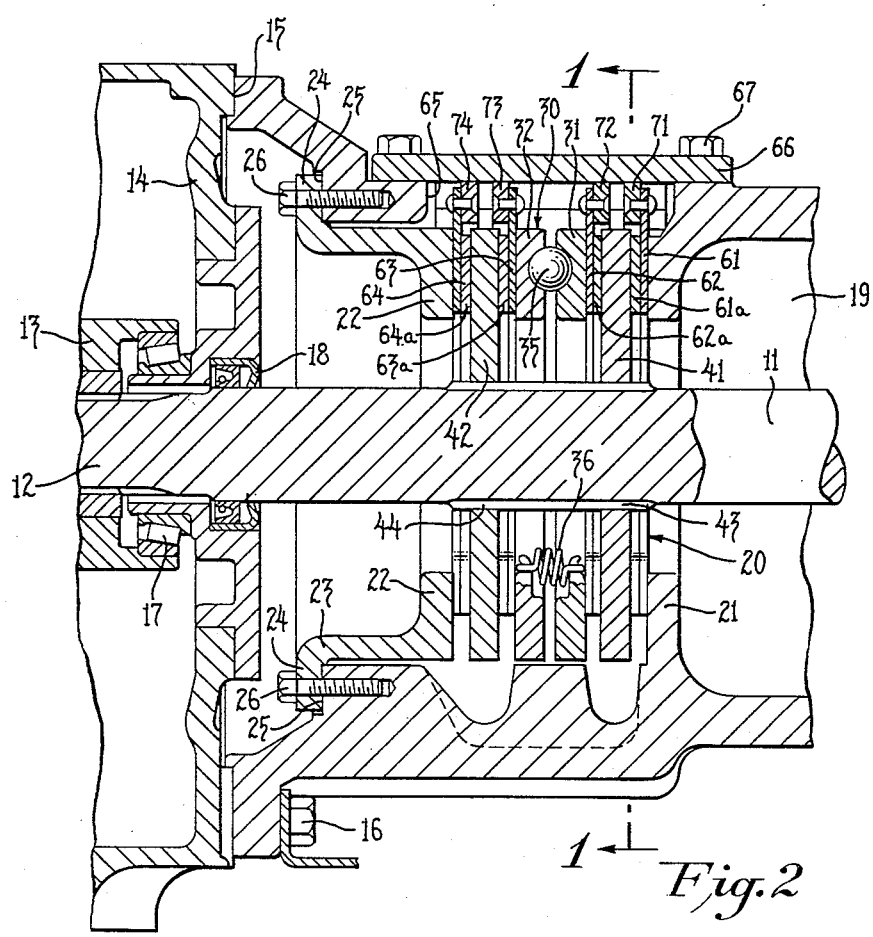
FIG. 2 is an axial section taken along line 2—2 in FIG. 1.

Turning now to the drawings, one skilled in the art will recognize FIGURES 1 and 2 as transverse and cross sections taken through the rear axle housing of a type characteristic of an agricultural tractor. (See for example the patent to Strehlow 2,417,139.) Centered within the axle housing is an axle 11 which is splined to carry a differential at its left hand end 12, the hub portion 13 only of the differential being shown. For the purpose of enclosing the axle housing and supporting the axle, an annular closure plate or flange is provided having a fitted annular joint 15 with the end of the rear axle housing. The rear axle housing is conventionally flared outwardly in the region of connection to the flange 14 giving rise to the name "trumpet" for the end portion thereof. For the purpose of securing the axle housing and flange 14 together a series of bolts 16 are provided, distributed about the periphery. Centered within the flange 14 is a differential bearing 17, and an adjacent oil seal 18 is provided for preventing escape of lubricant along the axle.

The diameter of the axle housing is sufficient both to provide physical strength and to define an annular space 19 in which a brake constructed in accordance with the present invention may be mounted.

The brake assembly, generally indicated at 20, includes a first stationary plate 21 of annular shape, and which may be integral with the axle housing, and a second stationary plate 22, also of annular shape arranged parallel to the first plate. Conveniently, the stationary plate 22 may be in the form of a cup-shaped member having a cylindrical side 23 and a flange 24 extending radially outward, the flange being secured to an annular mounting surface 25 by means of a series of bolts 26.

Arranged between the stationary plates 21, 22 is a pressure plate assembly 30 which includes a first annular pressure plate 31, and a second annular pressure plate 32, the plates being arranged back to back and having registering recesses 33, 34 for accommodation of a series of balls 35 spaced at regular intervals and biased together by a series of short coil springs 36. The plates are supported in centered position by spaced inwardly extending lugs or guides 37 integrally formed in the inside of the axle housing. To insure that the pressure plates do not rotate, stop lugs 38 are formed thereon positioned to engage the lugs 37 on the housing.

Centered between the stationary plate 21 and the pressure plate 31 is a flat braking disc 41, and centered between the plates 22, 32 is a similar braking disc 42. These discs are rotatably secured to the axle 11 on splines 43, 44 providing limited axial movement so that the discs are free to move endwise slightly in response to application of braking pressure as well become clear.

In practicing the present invention means are provided for camming the pressure plates away from one another and toward the respective discs in response to application of braking pressure. This is accomplished in the present instance by providing oppositely directed ramp surfaces in the opposed recesses 33, 34 so that each ball 35 tends to ride up on the adjacent ramps as the plates are relatively twisted. To supply the twisting force, plates 31, 32 are provided with mounting lugs 51, 52 to which are secured toggle links 53, 54 which are pinned at their inner ends to a pull rod 55. For applying braking force to the pull rod 55, the pull rod is extended through the wall of the axle housing and into engagement with the pull rod lever 56 mounted on a pivot 57. For rocking the lever 56 through a limited angle, a bell crank 60 is used having a bell crank pivot 58 and a return spring 59 which may be coupled to the brake pedal or brake servo actuator.

With regard to the operation of the linkage just described, it will be apparent, referring to FIG. 1, that clockwise rotation of the bell crank 60 produces rocking of the lever 56 pulling the pull rod 55 radially outward. Movement of the pull rod acts to tension the toggle links 53, 54 thus drawing the mounting lugs 51, 52 toward one another to supply relative twisting force to the pressure plates 31, 32 which are, as a result, cammed away from one another.

In accordance with the present invention lining elements of generally annular shape are interposed between the plates and the discs, with the lining elements being locked against rotational movement with respect to the axle housing and each having a slot formed therein for clearing the axle to permit withdrawal of the elements through a suitable aperture formed in the side of the axle housing whenever required for inspection or replacement. In the present instance the lining elements are arranged in pairs with a first pair 61, 62 straddling the disc 41, and a second pair 63, 64 straddling the disc 42. Positioned opposite lining elements 61–64 is a rectangular aperture 65 formed in the axle housing and which is normally enclosed by a cover plate 66 held in place by bolts 67. To permit withdrawal of the lining elements through the aperture 65, each of the elements has a slot formed therein at a position opposite the aperture. Thus in the present instance as shown in FIG. 1 the lining element 61 is slotted to provide an interruption or clearance space 70 which is adequate to "clear" the shaft 11 when the element is withdrawn. Registering slots are formed in the elements 62, 63, 64.

In accordance with one of the aspects of the invention, the lining elements 61–64 are keyed to the cover plate 66 in order to position them with respect to the cooperating stationary plates and pressure plates thereby to resist the torque applied by the discs, but with provision for limited axial movement so that the lining elements are free to move into and out of engagement with the brake discs when braking pressure is applied and released. Thus the lining elements are, in the present instance, mounted upon axially slideable lugs 71–74, respectively, which have outwardly projecting ears registering with slots 75, 76 formed on the underside of the cover plate. The lining elements are secured to the lugs by rivets 77 or the like. Since the cover plate is rigidly secured to, and accurately positioned in, the axle housing by the bolts 67, it will be apparent that the lining elements are not only capable of resisting large values of torque, but the lining elements are properly centered with respect to the surfaces which they engage without adjustment or exercise of care or attention.

The lining elements 61–64 are preferably of composite construction, including a backing element formed of sheet steel or equivalent with a co-extensive facing or lining securely bonded thereto. The latter may consist of any wear-resistant, friction-producing composition, the particular composition being a matter well within the skill of the art. Under conditions of extended use it is to be expected that the lining material, indicated at 61a–64a, will be progressively worn away, the actuating linkages being perferably designed with adequate take-up so that substantially the full thickness of the lining may be utilized.

Figure 3:
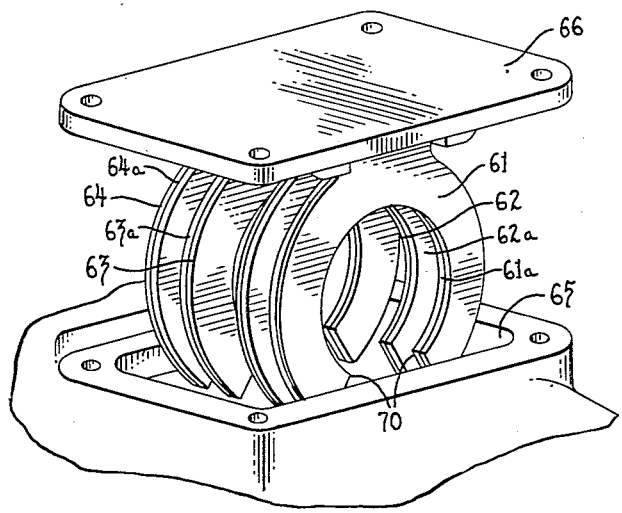
FIG. 3 is a fragmentary perspective showing removal of a brake lining assembly constructed in accordance with the invention.

It is, of course, desirable to inspect the condition of the lining material from time to time in order to determine how much life may be left since it is undesirable to have the brakes fail during the busy plowing or harvesting season. Normally such inspection is not considered practical since, in conventional tractor construction, inspecting the linings requires the removal of the wheel from the axle and unseating of the flange member 14 which encloses the end of the trumpet on the rear axle housing. However when using the present construction inspecting the linings is a simple matter, requiring only the unscrewing of four bolts 67 with the entire lining assembly being withdrawn simultaneously as shown in FIG. 3. If it is found that the linings are worn to the point of replacement, it is a simple matter to slide the old lining elements out of the registering grooves 75, 76 in the cover plate, replacing them with a new set. The new set is simply slipped into place by seating the cover plate 66 on the mounting or locating surface and by screwing tight the screws 67 which retain it. The lengthy and time-consuming operation, which is particularly troublesome in the case of conventional tractors of large size, is thus reduced to a job which may be performed by the farmer himself in a few minutes and requiring only a small wrench for unscrewing the retaining screws. As a result of the easy access there is not only a saving in labor but also a saving in parts since the linings, when frequently inspected may be worn, with safety, to a greater depth.

While the normal braking operation and the function of the novel lining elements will be apparent to one skilled in the art from the above description, it may be helpful to review a typical braking operation. Pressure is applied to the brake pedal rotating the bell crank 60 and tensioning the toggle links 53, 54 which causes the pressure plates to be relatively twisted about their common axis and, by the crowding action of the balls and ramps, cammed away from one another. Since the lining elements and the brake discs are freely slideable, they are free to assume equilibrium positions, insuring that the pressures existing between the elements are equally distributed. Thus the only force transmitted to the cover plate, and hence to the axle housing, is in the nature of pure torque. Upon releasing pressure from the brake pedal, the return spring 59 secured to the bell crank rotates the bell crank around to a releasing position, and the return springs 36 interposed between the pressure plates, applying a combined axial and peripheral force, serve to seat the balls 35 in the recesses 33, 34 bringing the pressure plates back together again. This releases the "near" lining elements 62, 63 which tend to move away from the discs 41, 42, in turn releasing the discs so that they are free to move away from the "far" lining elements 61, 64. Thus there is little or no residual drag in the brake when the braking pressure is released.

It will be apparent to one skilled in the art that the above described brake construction is not limited to use in a tractor rear axle housing. The construction may be used with considerable advantage in the rear axle housings of trucks, passenger automobiles, or anywhere else where it is desirable to provide lining elements which may be easily inspected and replaced without necessity for removing the wheels of the vehicle. Or, if desired, the brake construction may be employed on the main vehicle drive shaft adjacent to, or even within, the transmission housing for use either as a conventional or parking brake.

In the present device the stationary plates are of annular shape so that the lining elements 61, 64 are supported over a large area permitting use of relatively thin metal. However it will be apparent that the stationary plates may, if desired, be segmented, provided that the lining elements are constructed to have sufficient inherent rigidity. The construction is inherently simple and inexpensive, and is applicable, with little modification, to tractors of conventional design.

In the following claims it will be understood that the term "tractor" is used in a broad generic sense and that the term "axle" is intended to cover any enclosed shaft. It will also be understood that the "movement" of the pressure plates is movement relative to the plates respectively opposed thereto. While the invention has been described in connection with a two-disc brake, it will be apparent that it is equally applicable to brakes having any desired number of discs.

I claim as my invention:

1. In a machine the combination comprising a housing having an axle journaled therein to define an annular space surrounding said axle, a stationary annular plate in said annular space rigidly secured to the axle housing, an annular pressure plate in said space arranged opposite said stationary plate and having means for crowding the same in the direction of said stationary plate, a disc rotatably secured to the axle and centered between said plates, a pair of lining element supports of a shape generally conforming to the shape of said stationary and pressure plates, said axle housing having an aperture on one side thereof opposite said lining supports, a mounting means for mounting said lining supports locked with respect to the axle housing but with provision for limited axial movement in response to movement of the pressure plate, lining material bonded to said supports and generally conforming to the shape thereof for engaging the surfaces of the disc, said lining supports and lining material having registering slots formed therein to clear said axle for removal when inspection or replacement is necessary.

2. In a machine the combination comprising a housing having an axle journaled therein to define an annular space surrounding said axle, a stationary annular plate in said annular space rigidly secured to the axle housing, an annular pressure plate in said space arranged opposite said stationary plate and having means for crowding the same in the direction of said stationary plate, a disc rotatably secured to the axle and centered between said plates, a pair of lining element supports of a shape generally conforming to the shape of said stationary and pressure plates, said axle housing having an aperture on one side thereof opposite said lining supports and having a removable cover plate for normally enclosing the same, said lining supports having an axial key connection with said cover plate so that they are capable of resisting the torque applied by the disc yet free to move endwise a small distance for immediate engagement and release of the disc upon changes in braking pressure, lining material bonded to said supports for engaging the surfaces of the disc, said lining supports and lining material having a registering slot formed therein opposite the region of attachment to said cover plate so that the supports are free to clear said axle for removal when the cover plate is removed from the axle housing.

3. In a machine housing having an axle journaled therein to define an annular space surrounding said axle, a stationary plate and a pressure plate in said annular space secured to the housing and arranged parallel to one another with means for applying axial pressure to the pressure plate, a disc on said axle arranged between said stationary plate and pressure plate, lining elements interposed between the disc and the respective plates, said axle housing having an aperture on one side thereof, a removable cover plate for normally covering the aperture, said lining elements being attached at their edges to said plate and being of slotted C-shape with the slots being directly opposite the points of attachment to permit withdrawal thereof upon removal of the plate.

4. In a machine the combination comprising a housing having an axle journaled therein to define an annular space surrounding said axle, said axle housing having a rectangular aperture formed on one side thereof, a first stationary annular plate in said annular space at one side of the aperture and a second stationary annular plate arranged parallel to the first at the other side of said aperture, a pair of pressure plates of annular shape centered between the stationary plates and having pressure applying means between them for camming them away from one another toward the respective stationary plates, all of said plates being secured against rotation to the axle housing, a pair of discs rotatably secured to the axle between the stationary plates and the respective pressure plates, lining elements interposed between the discs and the plates, said lining elements being of slotted C shape to permit them to be inserted into place through said aperture, a removable cover plate covering said aperture, said lining elements being secured to said cover plate and having axially extending key connections with the inside wall of the cover plate at a region opposite the slots respectively formed therein so that the elements are securely braced against rotation in the face of torque applied to the discs while nevertheless being free to move slightly in the axial direction for prompt engagement and release of the discs in response to movement of the pressure plates.

5. In a machine housing having a shaft journaled therein to define an annular space surrounding said shaft, a stationary plate and an axially movable pressure plate secured in said annular space and arranged parallel to one another with means for applying axial pressure to the pressure plate, a disc rotatably secured to said shaft between said stationary plate and pressure plate, lining elements of generally annular shape interposed in their operative position between the disc and the respective plates, said housing having an aperture opposite said lining elements and a removable cover plate for normally covering the aperture, said lining elements being slotted so as to be removable from their operative position by movement in a direction transverse to said shaft, and means for independently mounting said elements against rotation when they are in their operative position.

6. In a machine housing having an axle journaled therein to define an annular space surrounding said axle, a stationary plate and a pressure plate in said annular space secured to the housing and arranged parallel to one another with means for applying axial pressure to the pressure plate, a disc non-rotatably secured to said axle arranged between said stationary plate and pressure plate, lining elements interposed between the disc and the respective plates and supported for slidable movement axially thereto, said axle housing having an aperture on one side thereof, a removable cover plate for normally covering the aperture, said lining elements having a generally planar, slotted C shape with the slot being wider than the axle within said C so that the elements can be removed through said aperture by movement solely in a radial direction.

References Cited in the file of this patent
UNITED STATES PATENTS

| 1,315,236 | Parker | Sept. 9, 1919 |
| 1,622,475 | Thomas | Mar. 29, 1927 |
| 2,174,396 | McCune | Sept. 26, 1939 |
| 2,368,317 | Meyer et al. | Jan. 30, 1945 |
| 2,387,039 | Parrett | Oct. 16, 1945 |
| 2,417,139 | Strehlow | Mar. 11, 1947 |
| 2,778,451 | Friedman | Jan. 22, 1957 |
| 2,874,807 | Hahn | Feb. 24, 1959 |
| 2,918,990 | Davis | Dec. 29, 1959 |